United States Patent [19]

King et al.

[11] Patent Number: 5,225,949
[45] Date of Patent: Jul. 6, 1993

[54] DISK DRIVE TRANSDUCER SUSPENSION ASSEMBLY OF REDUCED THICKNESS

[75] Inventors: Michael O. King, Boise; Burce J. Jackson, Star, both of Id.

[73] Assignee: Hewlett-Packard Company, Palo Alto, Calif.

[21] Appl. No.: 842,701

[22] Filed: Feb. 26, 1992

[51] Int. Cl.$^5$ .......................... G11B 5/55; G11B 21/20
[52] U.S. Cl. .................................................... 360/104
[58] Field of Search ......................................... 360/104

[56] References Cited

U.S. PATENT DOCUMENTS 4,829,395  5/1989  Coon et al. ............................ 360/104
5,140,481  8/1992  Cain et al. ............................ 360/104

Primary Examiner—Robert S. Tupper
Attorney, Agent, or Firm—E. F. Oberheim

[57] ABSTRACT

Closer spacing of the disks in a disk stack of a disk drive is achieved by joining together the reinforcing plates, sometimes called swage plates, of pairs of load beams of the actuator arm structure to form a transducer suspension assembly of an integrated pair of load beams, each load beam having a distal end flexibly mounting a transducer The transducer of each integrated load beam pair are aligned with each other and face in opposite directions. A load beam extension at the load beam end opposite the distal end of each extends beyond the reinforcing plate. These load beam extensions in each transducer suspension assembly are spaced apart by the thickness of the two reinforcing plates and span the thickness of an actuator arm of the actuator arm structure. The load beam extensions are joined to the opposite faces of the actuator arm. The transducers fit between and confront the surfaces of adjacent axially spaced disks in the disk stack. Joining of the load beam extensions to the opposite faces of the actuator arm may be accomplished by bonding agents such as adhesives, swaging, or by welding, the latter where both the actuator arm and the load beams are of materials that may be welded together.

10 Claims, 2 Drawing Sheets

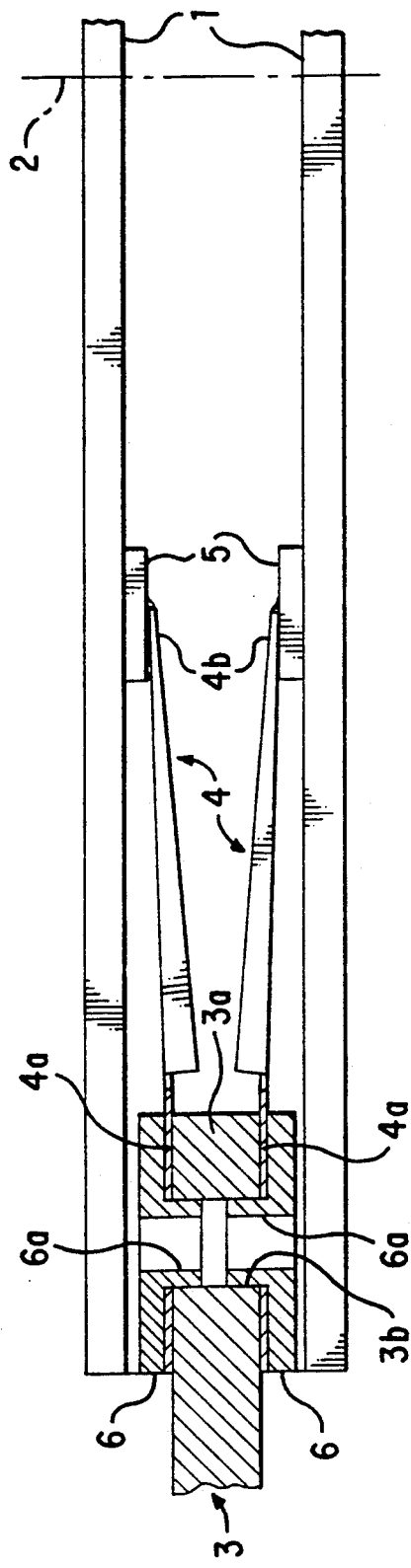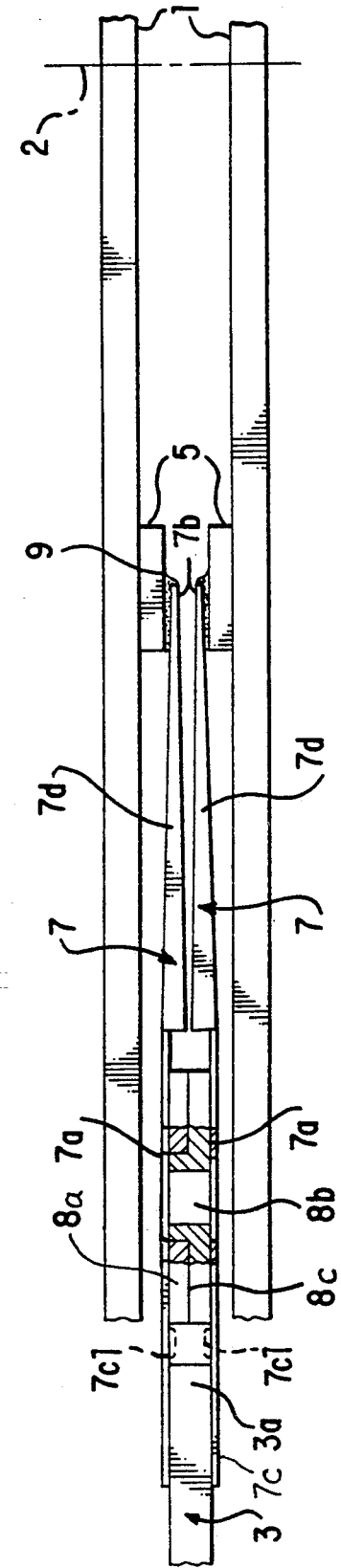

DISK DRIVE TRANSDUCER SUSPENSION ASSEMBLY OF REDUCED THICKNESS

RELATED APPLICATION

The application of Wayne E. Foote Ser. No. 07/846,270, entitled "Head Suspension Assembly For A Disk Drive", filed on the same day as this application and assigned to the assignee of this invention, is related to this application.

TECHNICAL FIELD

This invention relates generally to disk drives and more particularly to transducer suspension assemblies for disk drives which permit reductions in axial spacing of disks in a disk stack.

BACKGROUND OF THE INVENTION

Trends in disk drive developments require an increase in the volumetric density of information storage and a reduction in the time required to access the stored information. One approach to increasing the density of information storage is to increase the number of disks in a given volume. This requires a reduction in the axial spacing of the disks which directly affects the design of the transducer suspension assembly, necessitating a reduction in its thickness. Increasing the number of disks increases the required number of transducers, load beams and arms for the actuator assembly, all of which add to the mass of or weight of, the actuator assembly, which supports, moves and positions the transducers. This is not consistent with a requirement for reducing the time required for accessing information on the disks.

A transducer suspension assembly conventionally comprises an arm connected to an actuator to be moved thereby. The distal end of the arm is connected to one end, called the mounting end, of a flexible or resilient load beam. A transducer, for example, a magnetic head, is flexibly supported on the distal end of the load beam in a position confronting the surface of the disk. In a disk stack of two or more disks, one arm of the actuator assembly will carry two such load beams in back-to-back relationship with the faces of the transducer confronting the adjacent surfaces of adjacent disks in the disk stack.

The load beams are fabricated of resilient stainless steel sheet which, in one form factor, are usually of the order of three mils in thickness. The load beams have channel or U-shaped cross sections. The mounting end of the load beam which is attached to the distal end of the arm, is fabricated with a reinforcing plate which is welded thereto. This reinforcing plate, which is used to mount the load beam, also has an essential reinforcement function for bending of the load beam, during the load beam fabrication process. This bend in the load beam is made to provide the required spring loading of the transducer against the surface of the disk, as is well known. Common practice in attaching the load beam to the arm is to screw the mounting end of the load beam to the arm through holes provided through the load beam and the reinforcing plate. See Robert B. Watrous U.S. Pat. Nos. 3,931,641 and 4,167,765. More recently, the reinforcing plate has been provided with a boss which fits into a hole in the distal end of the arm. See Coon et al U.S. Pat. No. 4,829,395 as an example. The bass is ball is bass is bass swaged in that hole to securely attach the load beam to the arm. The reinforcing plate, or swage plate, is an indispensable part of the load beam structure.

In such arrangements, the reinforcing plate (insert 132), which may be 20 mils thick, as stated by Coon et al, adds to the thickness of the actuator assembly at the point of its attachment to the distal end of the arm, which is a factor in any attempt to reduce disk spacing. Prior art practice, whether the load beam is attached to the distal end of the arm by means of screws or by ball swaging, according to the Watrous patents, supra, places the reinforcement plate between the load beam and the distal end of the arm. Thus the thickness of the actuator assembly at the distal end of the arm, which comprises the sum of the thickness of the arm, twice the thickness of a load beam, twice the thickness of a reinforcing plate, twice the thickness of a screw head, if screw attachment is used, and twice the clearance between a disk surface and the arm assembly at the distal end of the arm, determines the minimum axial spacing of the disks. There must be clearance between the disk and the arm assembly for mounting error tolerances and relative movement of the various structures during shock and vibration.

The patentees Coon et al, in U.S. Pat. No. 4,829,395, discuss the prior art arrangement aforesaid and, in an effort to achieve a reduction in disk spacing, disclose an arm structure to reduce the thickness of the actuator assembly, measured across the mounting ends of the load beams adjacent at the distal end of the arm, i.e., the load beam/arm attachment, by placing the load beam between the reinforcing plate (insert 132) and the arm. Then, by controlling the actuator assembly to prevent the reinforcing plates (inserts 132) from passing between the adjacent disks, the disk spacing may be reduced by twice the thickness of a reinforcing plate (insert 132). This, of course, assumes that the combined thickness of the two heads, their flexure mounts, the thickness of the distal ends of the load beams, and the clearance between the distal ends of the load beams, is less than the thickness of the actuator assembly at the load beam/arm attachment location.

FIG. 1 of this application illustrates a prior art structure of the type patented by Coon et al. Axially spaced disks 1 rotate about an axis 2. An arm 3 of an armstack structure, has a distal end 3a to which the mounting ends 4a of a pair of load beams 4 are attached. The distal ends 4b of the load beams 4 flexibly mount the transducers 5 which have faces which confront respective surfaces of the adjacent disks 1. A reinforcing plate, in this case a swage plate 6, is welded to the mounting end 4a of each load beam 4. A boss 6a is an integral part of each swage plate 6. The load beams are disposed against opposite faces of the distal end 3a of the arm 3, in which position the bosses 6a project into opposite ends of an opening 3b in the distal end of the arm 3. These bosses are ball swaged in the hole 3b to secure the load beams to the arm 3.

The swage plates 6 are shown in a position between the disks 1. According to Coon et al, if the swage plates 6 are prevented from passing between the disks, the disk spacing may be reduced a distance equal to twice the thickness of the swage plates 6. In that situation the disks need to clear only the load beams 4, since the swage plates 6 remain outside the peripheral edges of the disks 1.

As will be been by reference to FIG. 1 herein, using the Coon et al swage plate thickness of 20 mils, this spacing, from that required to clear the swage plates 6, may be reduced by 40 mils, providing the same disk clearance for the load beams as that which had been provided for the swage plates. A reductions in disk spacing by this approach, however, is limited by the axial dimension of the bosses 6a. The bosses must be of sufficient length to obtain and maintain a secure grip on the wall of the hole 3b. Additionally, clearance is required between the ends of the bosses sufficient to avoid end-to-end contact during swaging.

In a more recent prior art design, the bosses are designed so that one boss fits within the other within the hole in the arm. This is known as an interlocking swage. Ball swaging through the inner boss simultaneously secures the bosses together and secures the outer boss in the hole in the distal end of the arm. This reduces the thickness of the arm/load beam assembly.

SUMMARY OF THE INVENTION

The reinforcing plates of the load beams are a necessary part of the fabrication process for precisely bending the load beams. These plates are necessarily welded to the load beams to provide an integrated, reinforced structure.

Instead of attaching the load beams to the arms via the reinforcement plates or swage plates, as in prior art practice, which adds to the arm thickness, this invention attaches the reinforcing plates to one another by welding, by a bonding agent or preferably by swaging, to form an integrated transducer suspension assembly in which the load beams are spaced apart by only twice the thickness of the reinforcing plates. Thus the total thickness of this integrated assembly at the reinforcing plates, again assuming the reinforcing plates are each 20 mils thick and the thickness of the stainless sheet of the load beams to be 3 mils, is only 46 mils. The distal ends of the load beams flexibly mount individual transducers, such as, magnetic heads, the slider faces of which face outwardly of the assembly.

This invention can either be used to decrease disk spacing, or to increase the clearance between the arm structure and the disk.

To mount this suspension assembly on the distal end of the arm, extensions of the end of the load beam beyond the reinforcing plate are provided. These load beam extensions straddle the distal end of the arm and are joined thereto by welding or preferably by bonding. Again assuming the reinforcing plates to be 20 mils thick and the load beams to be of a stainless steel sheet which is 3 mils thick, a total thickness of only 46 mils for the arm structure at the arm/load beam attachment location is achieved. There are no projections such as plates and screws at that location.

While 20 mils has been used here as the thickness of the reinforcing plates to be consistent with the dimensions of Coon et al, in the best mode for practicing the invention the reinforcing plates were only 12 mils thick.

The structural geometry is mechanically stable. The arrangement provides a rectangular or parallelogram arm/load beam connection. The length of the load beam legs between the end of the arm and the confronting end of the reinforcing plates, is chosen to provide stability in compression and bending for all operational loads and for predetermined loads due to mechanical shock. In accomplishing this goal, lateral marginal flanges may be provided on the load beam extensions between the reinforcing plate and the arm. This entire head suspension assembly may now pass between adjacent disks, unlike Coon et al in which the swage plates 6 are necessarily kept from passing between the disks, which latter severely limits the useful length of the head suspension to only the length of the load beam 4.

BRIEF DESCRIPTION OF THE DRAWINGS

The invention will be better understood by reference to the following specification when considered in conjunction with the accompanying drawings, in which:

FIG. 1 is a fragmentary edge view of a prior art disk drive illustrating the arm/load beam connection of the head suspension assembly in cross section.

FIG. 2 is a fragmentary edge view of a disk drive illustrating a head suspension assembly according to this invention.

DESCRIPTION OF THE PREFERRED EMBODIMENTS

Figure 3A:
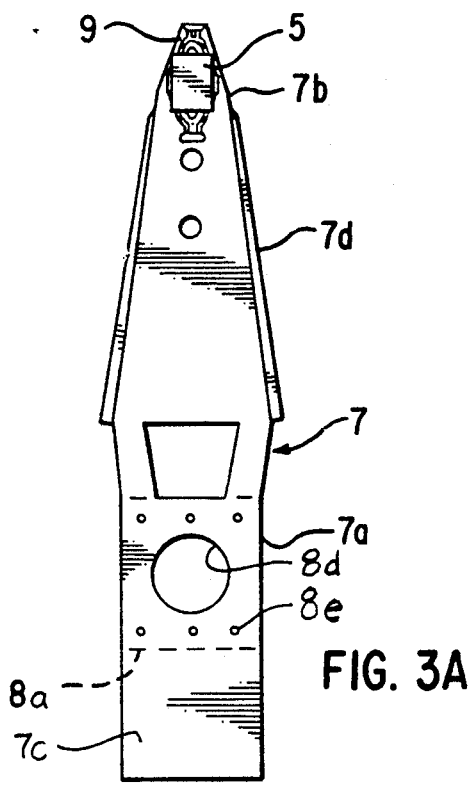
FIGS. 3A and 3B are plan and perspective views, respectively, of one of the load beams of one of the embodiments of this invention.

Improvement over the prior art structure of FIG. 1 is provided by the invention as illustrated in FIG. 2 in which the disks 1, again rotatable about the axis 2, are axially stacked and significantly reduced in axial spacing due to the reduction in the thickness dimension of the arm stack structure.

In FIG. 2, a pair of load beams 7 again mount the transducers or heads 5 at the distal ends 7b of the load beams in positions in which the transducers 5 each engage a confronting surface of the adjacent disk 2. Each load beam 7 is provided with a reinforcing plate 8a, 8b, respectively, which is permanently attached to the load beam 5 at its mounting end 7a. Usually, these reinforcing plates are laser spot welded at a plurality of points 8e to the load beams. The reinforcing plates 8a, 8b are joined together at their juxtaposed surfaces 8a by welding, bonding or swaging, swaging being a presently preferred and easily accomplished procedure for joining the reinforcing plates together. Load beam extensions 7c extend beyond the reinforcing plates 8a, 8b. These extensions are spaced apart a distance corresponding to twice the thickness of one of the reinforcing plates 8. The extensions 7c straddle the thickness of the distal end 3a of the arm 3 and are joined to the arm 3 by any suitable means. Joining by bonding with a suitable bonding agent is preferred, particularly in situations where the metal of the load beam may be different from the metal or other material of the arm 3. Where the materials are dissimilar and have different thermal coefficients of expansion, preferred adhesives or bonding agents are compliant in a degree to accommodate the shear loads due to the differential thermal dimensional response without bond failure and without experiencing permanent displacement between the faces at the joint which would produce head/disk/actuator misregistration. Suitable bonding agents include cyano acrylic, epoxy, thermo plastic adhesives (hot melt) and pressure sensitive types of adhesives. Of this group, cyano acrylic is presently preferred in practicing the best mode of this invention.

Figure 3B:
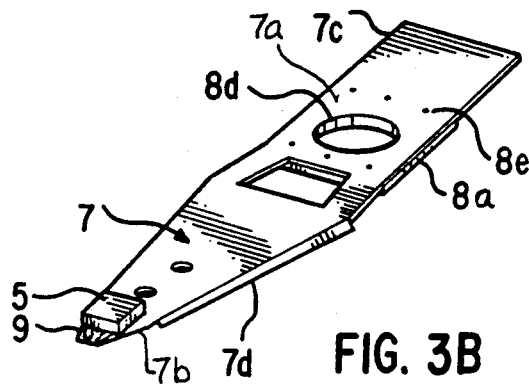
Figure 4A:
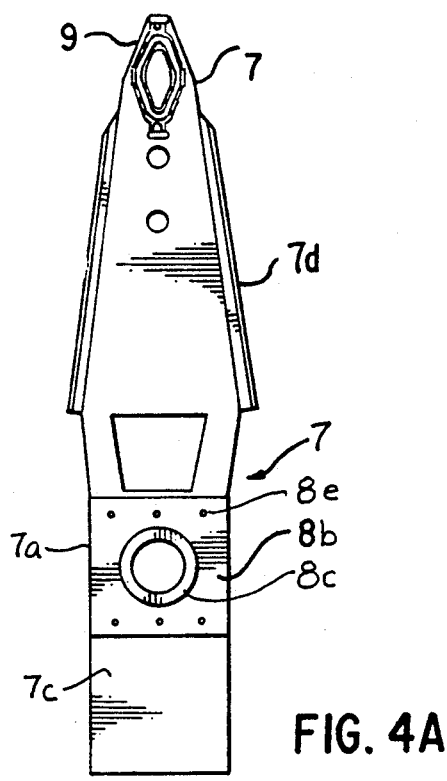
FIGS. 4A and 4B are plan and perspective views, respectively, of the other of the load beams of said one of the embodiments of this invention.
Figure 4B:
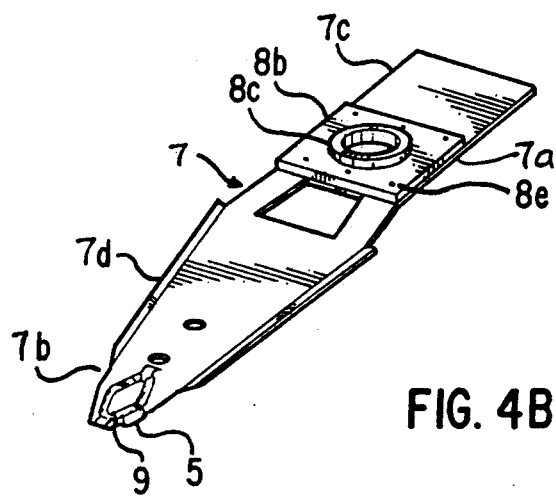

The best mode for practicing this invention comprises load beams 7 of the types illustrated in FIGS. 3A, 3B, 4A and 4B. FIGS. 3A and 3B illustrate the front face of the load beam 7 and FIGS. 4A and 4B illustrate the load beam back face. These drawing figures illustrate load beam structures which may be swaged together to form an integrated transducer suspension assembly. The load beams 7, per se, are identical and comprise a thin stainless steel sheet which is usually etched in planform and then formed in the configuration seen in FIGS. 3A, 3B, 4A and 4B. The load beams 7 are tapered in planform from their mounting ends 7a, narrowing towards their distal ends 7b and in this region are provided with flanges 7d. Flexures 9 at the distal ends 7b mount the transducers 5. The transducers 5 are mounted by the flexures 9 on that surface, called the front face, of the load beam 7 which is opposite to that direction in which the flanges 7d are bent. The reinforcing plates 8a and 8b are mounted on the opposite surface, called the back face, of the load beam 7 from that on which the transducer mounted and define, with the extensions 7c, the mounting end 7a of the load beams. Six spots of laser welding 8e join the reinforcing plates 8a, 8b to the load beams 7. The reinforcing plates 8a, 8b are actually mated swage plates. The swage plate 8a is the female swage plate and the swage plate 8b is the male swage plate. The male swage plate 8b is provided with a boss 8c which fits within an opening 8d in the female swage plate 8a. As seen in FIG. 2, these swage plates 8a, 8b are fitted together face-to-face with the boss 8c projecting into the opening 8d in the female swage plate 8a. Thereafter, with the load beams precisely indexed with their longitudinal axes in alignment, ball swaging is performed to securely join the swage plates 8a and 8b together. providing an integrated transducer suspension assembly. As seen in FIG. 2, the load beam extensions 7c are spaced apart and project from the mounting end 7a of the load beams. The extensions 7c straddle and overlap the distal end 3a of the arm 3 and are thereafter securely bonded to the arm, as described hereinabove. Jigging procedures for this purpose are well known.

While the arm 3 has been described as a single piece structure which may be a part of a single piece arm stack structure, such as described by Coon et al, an arm structure may be used of the type described by Wayne E. Foote in U.S. Pat. No. 4,994,931, entitled "Actuator Structure For A Magnetic Head Suspension Assembly in a Disk Drive" and assigned to the assignee of this invention. The subject matter of this patent to Foote is incorporated herein by reference thereto.

In the patent to Foote, laminated arm structures 3d are described which are fabricated of stainless steel. These arm structures are attached to a bearing housing and constitute part of a rotary actuator structure. These stainless steel arms are fabricated of identical planform and cross sectional configuration and are assembled in back-to-back relationship in their attachment to the bearing housing. The fabrication of these stainless steel arms may be of sheet material of a different or the same thickness as the swage plates, as seen in Foote's FIG. 2, but being of stainless steel fitted between the load beam extensions 7C of this application may be laser spot welded thereto.

The spacing of the swage plates 8a, 8b the distal end 3a of the arm 3 as seen in FIG. 2 is such that the unsupported portion of each load beam extension 7c, lying between the distal end 3a of the arm 3 and the swage plates 8a, 8b defining a parallelogram type of structure, has sufficient long column stability in compression to obviate collapse in the presence of operating loads and predetermined values of mechanical shock. The structure illustrated is dimensionally stable and permits a significant reduction in the axial spacing of the disks. In order to stiffen and thereby improve stability in this region of the load beam extensions 7c, flanges may be provided at the lateral edges of the load beams as indicated in doted outline at 7cI. As a further alternative, the swage plates 8a, 8b may abut the extremity of the distal end 3a of the arm 3.

In a construction of the type described herein the swage plates 8a, 8b are fixed or joined together and are not fixed or joined to the arm 3, which significantly reduces the thickness of the arm structure at the attachment of the head suspension assembly to the arm 3. Assuming that the load beams 7 are of the same length as those of the prior art configuration shown in FIG. 1, between the swage plates and the transducers, the load beam extensions 7c permit shortening of the arm 3. This reduces the weight of the head suspension assembly to reduce the angular moment of inertia. Further, the thickness of that arm is substantially the same as the combined thickness of the pair of swage plates, or may be less, The arm structure of this invention reduces sectional dimension of the arm, measured in the axial direction of the disk stack, so that, unlike Coon et al, the entire head suspension assembly may pass between the disks. Thus, an additional benefit which flows from the structure, according to this invention, is that there is less rotating or linearly propelled mass at the swage area and in the overall arm structure, which reduces the moment of inertia of the structure. Still further, by bonding or welding the load beam extensions 7c to the arm 3, there are no projections, such as screw heads, or swage plates, in the load beam/arm attach area, to damage the disks or to require space for clearance.

We claim:

1. A disk drive, comprising:
   a. a stack of two axially spaced, rotatably mounted disks;
   b. an actuator arm having opposite faces defining a distal end of a predetermined thickness;
   c. means for movably mounting said actuator arm for movement in a plane which is intermediate said axially spaced disks;
   d. two flexible correspondingly shaped load beams, each having a mounting end and a distal end;
   e. a transducer flexibly mounted on the distal end of each load beam;
   f. spacer means joining said load beams together at corresponding locations on each adjacent to and spaced from said mounting end of each for providing an extension of each load beam extending beyond said spacer means at each mounting end and for spacing the mounting ends apart a distance substantially the same as said predetermined thickness of said distal end of said actuator arm with said transducers facing in opposite directions; and
   g. means for securing the extensions of said load beams respectively at said mounting ends to said opposite faces respectively of said actuator arm with said transducers between and confronting adjacent surfaces of said axially spaced disks.

2. The invention according to claims 1, in which:
   a. said spacer means comprises a reinforcing plate on one load beam having an opening therethrough; and
   b. a reinforcing plate on the other of said load beam having a boss thereon secured within said opening and securely joining said reinforcing plates together.

3. The invention according to claim 2, in which:

a. said reinforcing plates are swage plates, and
b. said boss is swaged within said opening to secure said boss within said opening.

4. A disk drive, comprising:
   a. a stack of two axially spaced rotatably mounted disks;
   b. an actuator arm having opposite faces defining a distal end of a predetermined thickness;
   c. means for movable mounting said actuator arm to move in a plane which is intermediate said axially spaced disks;
   d. two flexible, correspondingly shaped load beams, each having a mounting end and a distal end;
   e. a transducer for each load beam;
   f. means for similarly flexibly mounting a transducer on the distal end of each load beam;
   g. spacer means joining said load beams together at corresponding locations on each, adjacent to and spaced from said mounting end of each for providing an extension of each load beam extending beyond said spacer means at each mounting end and for spacing the extensions apart a distance substantially the same as said predetermined thickness of said distal end of said actuator arm, with one transducer adjacent the other and facing in a direction opposite the other, and
   h. means for securing one load beam extension to one face of the opposite faces of said actuator arm and for securing the other load beam extension to the other face of the opposite faces of said actuator arm, with said transducers between and confronting adjacent surfaces of said axially spaced disks.

5. The invention according to claim 4, in which:
   said means for flexibly mounting a transducer comprises a leaf spring.

6. A transducer suspension assembly for attachment to an actuator in a disk drive, comprising:
   a. a pair of load beams each having a mounting end and a distal end;
   b. a transducer on said distal end of each load beam; and
   c. spacer means between said load beams joining said load beams together at corresponding locations on each load beam adjacent to and spaced from each load beam end at the mounting end of each, with one transducer adjacent the other and facing in a direction opposite the other transducer, providing spaced load beam extension extending beyond said spacer means at said mounting end for attachment to said actuator.

7. A transducer suspension assembly for attachment to an actuator in a disk drive, comprising:
   a. a pair of load beams each having a mounting end and a distal end;
   b. a transducer for each load beam;
   c. means for flexibly mounting a transducer on the distal end of each load beam, and
   d. spacer means between said load beams joining said load beams together at corresponding locations on each load beam adjacent to and spaced from each load beam end at the mounting end of each, with one transducer adjacent the other and facing in a direction opposite that of the other transducer, providing spaced load beam extensions, spaced by said spacer means, extending beyond said spacer means at said mounting end for attachment to said actuator.

8. The invention according to claim 7, in which:
   a. said means for flexibly mounting a transducer comprises a leaf spring.

9. A disk drive, comprising:
   a. a stack of two axially spaced rotatably mounted disks;
   b. an actuator arm having opposite faces defining a distal end of a predetermined thickness;
   c. means for movably mounting said actuator arm for movement in a plane which is intermediate said axially spaced disks;
   d. two flexible correspondingly shaped load beams each having a mounting end and a distal end;
   e. a transducer flexibly mounted on the distal end of each load beam;
   f. means for securing the mounting ends of said load beams, respectively, to the respective opposite faces of said actuator arm with said transducers between and confronting adjacent surfaces of said axially spaced disks and
   g. spacer means between said load beams joining said load beams together in a load beam assembly at a location on said load beams between said mounting end and said distal end of each load beam, the thickness of said load beam assembly at least at said spacer means being less than the axial spacing between said disks.

10. The invention according to claim 9, in which:
    a. said spacer means comprising a plate on each load beam, and
    b. means joining the plates together in face-to-face relationship.

* * * * *